United States Patent
Liao et al.

(10) Patent No.: US 9,002,954 B2
(45) Date of Patent: Apr. 7, 2015

(54) TASK MANAGEMENT SYSTEM ASSOCIATING WITH CONTACT INFORMATION AND METHOD THEREOF

(75) Inventors: Shen-Jai S J Liao, Danshui (TW); Jacqueline Li-Ling Yen, Taipei (TW); Ying-Chen Yu, Taipei (TW)

(73) Assignee: International Business Machines Corporation, Armonk, NY (US)

(*) Notice: Subject to any disclaimer, the term of this patent is extended or adjusted under 35 U.S.C. 154(b) by 637 days.

(21) Appl. No.: 12/956,243

(22) Filed: Nov. 30, 2010

(65) Prior Publication Data

US 2011/0131285 A1 Jun. 2, 2011

(30) Foreign Application Priority Data

Nov. 30, 2009 (TW) .............................. 98140931 A (51) Int. Cl.
*H04L 29/06* (2006.01)
*G06Q 10/10* (2012.01)
*H04L 29/08* (2006.01)

(52) U.S. Cl.
CPC .......... *G06Q 10/1097* (2013.01); *G06Q 10/107* (2013.01); *H04L 29/06* (2013.01); *H04L 29/08072* (2013.01)

(58) Field of Classification Search
CPC ..... G06Q 10/107; H04L 12/585; H04L 12/58
USPC .......................................................... 709/206
See application file for complete search history.

(56) References Cited

U.S. PATENT DOCUMENTS

| | | | |
|---|---|---|---|
| 6,810,383 | B1 | 10/2004 | Loveland |
| 6,907,447 | B1 | 6/2005 | Cooperman et al. |
| 7,076,043 | B2 | 7/2006 | Curbow et al. |
| 7,120,672 | B1 | 10/2006 | Szeto et al. |
| 7,568,007 | B2 | 7/2009 | Narayanaswami et al. |
| 2002/0078007 | A1* | 6/2002 | Herrero .............................. 707/1 |

(Continued)

FOREIGN PATENT DOCUMENTS

| | | |
|---|---|---|
| CN | 1558646 A | 12/2004 |
| CN | 101047556 A | 10/2007 |

(Continued)

OTHER PUBLICATIONS

Office Action, Chinese PTO.

*Primary Examiner* — Faruk Hamza
*Assistant Examiner* — Abu-Sayeed Haque
(74) *Attorney, Agent, or Firm* — Patents on Demand P.A.; Brian K. Buchheit; Scott M. Garrett (57) ABSTRACT

A task item can be stored in a collaboration database, wherein the collaboration database able to be accessed by a communication module and a task management tool, which both run on a client. The communication module can be able to access a communication server that provides a communication service to the client. The task management tool can be able to access a collaboration server that provides a collaboration service to the client. A collaboration item can be established that contains a task identifier associating with the task item and a collaboration identifier associating with contact information. The communication module running in a client can be called according to the contact information of the collaboration database. The task item can be displayed within a user interface of a communication application via the communication module.

18 Claims, 12 Drawing Sheets

(56) References Cited

U.S. PATENT DOCUMENTS

| | | |
|---|---|---|
| 2004/0054802 A1 | 3/2004 | Beauchamp et al. |
| 2004/0267871 A1 | 12/2004 | Pratley et al. |
| 2005/0021652 A1 | 1/2005 | McCormack et al. |
| 2005/0027805 A1 | 2/2005 | Aoki |
| 2005/0182773 A1 | 8/2005 | Feinsmith |
| 2006/0143613 A1 | 6/2006 | Lippe et al. |
| 2006/0210034 A1 | 9/2006 | Beedle et al. |
| 2006/0248012 A1 | 11/2006 | Kircher et al. |
| 2007/0078938 A1 | 4/2007 | Hu et al. |
| 2007/0118598 A1 | 5/2007 | Bedi et al. |
| 2007/0192423 A1 | 8/2007 | Karlson |
| 2007/0244980 A1 | 10/2007 | Baker, III et al. |
| 2007/0282660 A1 | 12/2007 | Forth |
| 2008/0028323 A1* | 1/2008 | Rosen et al. .................. 715/752 |
| 2008/0147733 A1 | 6/2008 | Cohen et al. |
| 2008/0209417 A1* | 8/2008 | Jakobson ...................... 718/100 |
| 2009/0049131 A1 | 2/2009 | Lyle et al. |
| 2009/0157693 A1 | 6/2009 | Palahnuk |
| 2009/0235182 A1 | 9/2009 | Kagawa et al. |
| 2010/0005398 A1* | 1/2010 | Pratley et al. ................. 715/751 |
| 2010/0145913 A1* | 6/2010 | Wilson et al. ................. 707/631 |

FOREIGN PATENT DOCUMENTS

| | | |
|---|---|---|
| CN | 101155059 A | 4/2008 |
| EP | 1372095 A1 | 5/2003 |
| TW | 460788 B | 10/2001 |
| TW | 582153 B | 4/2004 |

\* cited by examiner

TASK MANAGEMENT SYSTEM ASSOCIATING WITH CONTACT INFORMATION AND METHOD THEREOF

CROSS REFERENCE TO RELATED APPLICATIONS

This application claims priority of Taiwan Patent Application Serial No. 098140931 entitled "TASK MANAGEMENT SYSTEM ASSOCIATING WITH CONTACT INFORMATION AND METHOD THEREOF", filed on Nov. 30, 2009.

BACKGROUND

The present invention relates to a task management system, and more particularly to a task management system for collaborating a communication module and a task management module by using contact information.

Internet communication tools are becoming increasingly significant to modern society and the variety of these tools are increasing proportionally. That is, popularity of communication tools have created a market pressure for new and specialized tools. At present, users of personal computers, smart phones, and other devices commonly use an instant messenger, an electronic mail program, voice communication tools (including telephony services provided over a telephone network and Voice Over Internet Protocol (VoIP) communicating, videoconference applications, micro-blogging applications, text messaging applications, social networking applications, and so on. Users can easily begin to lose track of a current status communication element, especially when so many different tools are used to communicate. For example, users of multiple communication tools fail to update a task management application to reflect communications that have occurred using one or more of the communication tools in their arsenal. This commonly occurs when the user experiences an unexpected interruption while communicating with another or soon upon completion of such a communication.

Conventional task management applications are flawed in that they require a significant amount of user interactions. Task management applications can, for example, require a user to enter and/or confirm information maintained by task management system. Then, separate and distinct user interfaces that are not tightly coupled to the task management applications are used to perform the tasks. This process is inefficient, inconvenient, and subject to user entry errors, which often causes the task management application data to be non-current or otherwise inaccurate. Problems increase when multiple people (an assistant for example) maintain a set of persons tasks within a task management application and engage in task-related communications. Problems also increase when communications occur via a set of different devices (i.e., smart phones are often used for short communications), which may interact with a task management application in different ways from each other.

BRIEF SUMMARY

Responsive to the above-mentioned issues in traditional techniques, several embodiments of the present invention are provided, such as a device, a method and a computer program product for automatically selecting internet browser and providing web service in order to improve one or many issues mentioned above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One aspect of the present invention discloses a method, computer program product, system, and apparatus for managing task associating with contact information. In this aspect, a task item can be stored in a collaboration database, wherein the collaboration database able to be accessed by a communication module and a task management tool, which both run on a client. The communication module can be able to access a communication server that provides a communication service to the client. The task management tool can be able to access a collaboration server that provides a collaboration service to the client. A collaboration item can be established that contains a task identifier associating with the task item and a collaboration identifier associating with contact information. The communication module running in a client can be called according to the contact information of the collaboration database. The task item can be displayed within a user interface of a communication application via the communication module.

Another aspect of the present invention discloses a system for managing task associating with contact information, including a communication module, a task management module and a collaboration database. The communication module can be able to access a communication server that provides a communication service to at least one client. The task management module can be able to access a collaboration server that provides a collaboration service to the at least one client. The collaboration database can store at least one collaboration item, where the collaboration item has a task identifier associating with the task item. The collaboration identifier can be associated with contact information. The collaboration database can be accessed by the communication module and the task management tool, which both run on the client, wherein the communication module arranges a list indicating at least one available task item and selectively displaying content of the task item responsive to an operation of a user.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The devices, methods, and computer program products are illustrated in the drawings as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
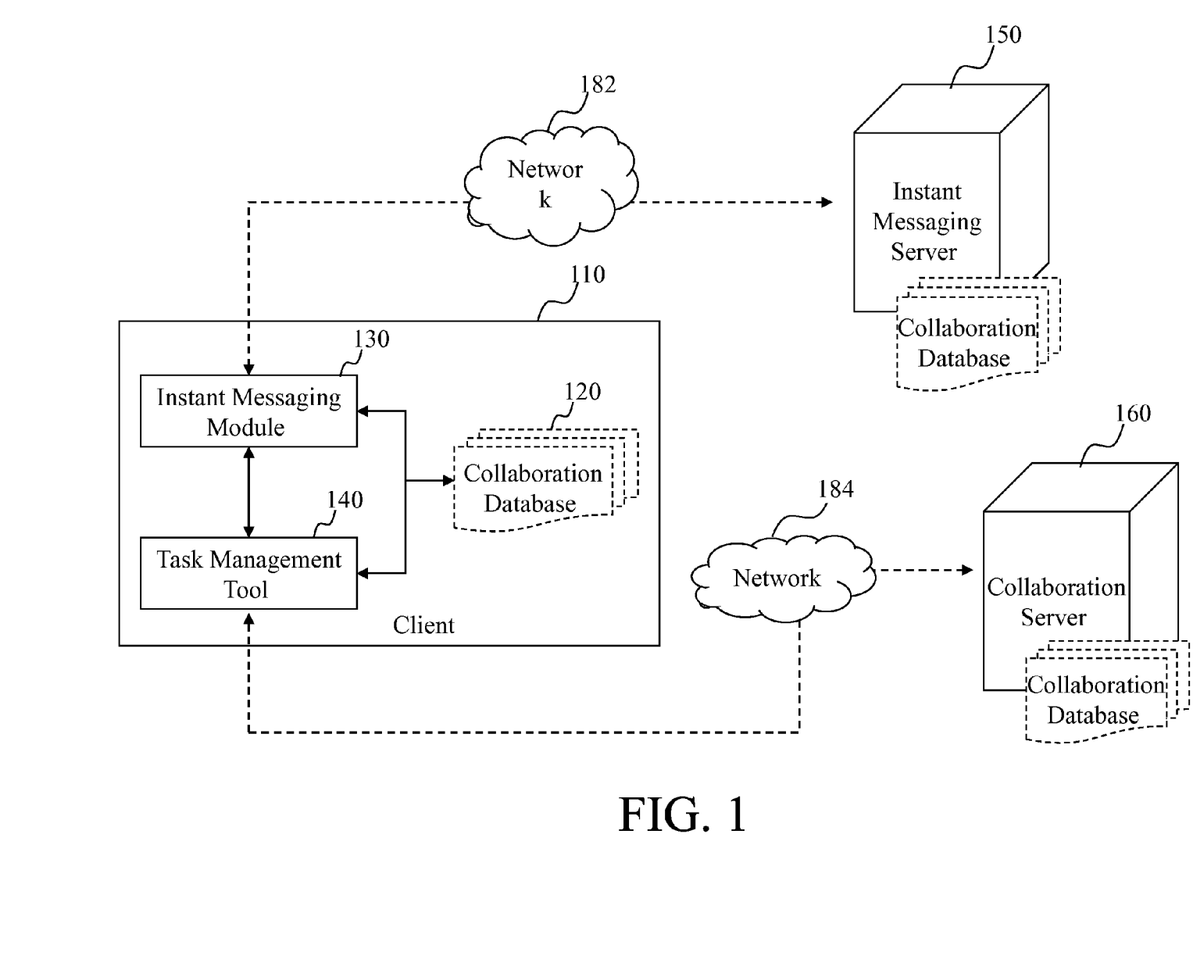
FIG. 1 is an exemplary system according to an embodiment of the present invention.

FIG. 1 is an exemplary system according to one embodiment of the present invention for exemplary rather than restrictive purpose. In this exemplary embodiment, a client 110 is coupled to an instant messaging server 150 and a collaboration server 160 respectively through networks 182 and 184.

In one embodiment according to the present invention, the client 110 may any electronic device for providing multimedia application, document editor, instant messaging, electronic mail, internet phone, and other internet or general applications. The client 110 represent a desktop computer, a notebook computer, a terminal device, a mobile phone, a personal digital assistant, a media player, and etc. For example, the client 110 can be a general-purpose desktop computer equipped with a processor for executing a variety of applications; a storage device for storing information and program codes; a display device, a communication device, and/or an input/output device as an interface to a user; and peripheral components or other special-purpose components. In other embodiments, the client 110 may be embodied in other forms and may be equipped with more or less components. Similarly, the instant messaging server 150 and the collaboration server 160 may be embodied as a general-purpose computer, a special-purpose computer, a high-level workstation, a mainframe and etc. in considering of the objects of specific embodiments. The networks 182 and 184 may be embodied in any form of connection, such as a permanent connection of local area network (LAN) or wide area network (WAN), or a temporary connection for dialing up to the internet through an internet service provider. Also, the present invention is not limited to wired connection or wireless connection.

In this embodiment, client 110 has a collaboration database 120, instant messaging module 130, task management tool 140, and other applications. The collaboration database 120 may be accessed by the instant messaging module 130, the task management tool 140 and other applications. The instant messaging module 130 and task management tool 140 are running under the operating system, such as Windows® series provided by Microsoft®, Lotus® series provided by IBM®, Android® series provided by Google®. In this embodiment, the instant messaging module 130 accesses the instant messaging server 150 via the network 182 for providing instant messaging service, such as Lotus Sametime® provided by IBM®, Live Messenger® provided by Microsoft®, Google Talk®, Skype®, ICQ®, AOL® and so on, herein also called communication module. On the other hand, the task management tool 140 accesses the collaboration server 160 via network 184 for providing task management service, such as Lotus Notes/Domino® provided by IBM®, Outlook/Exchange® provided by Microsoft®, Google Calendar® and so on, herein also called as task management module. In this embodiment, the instant messaging module 130 and task management tool 140 may share information through the collaboration database 120 in order to provide an integrated service to the user, which will be further described below.

It should be noted that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
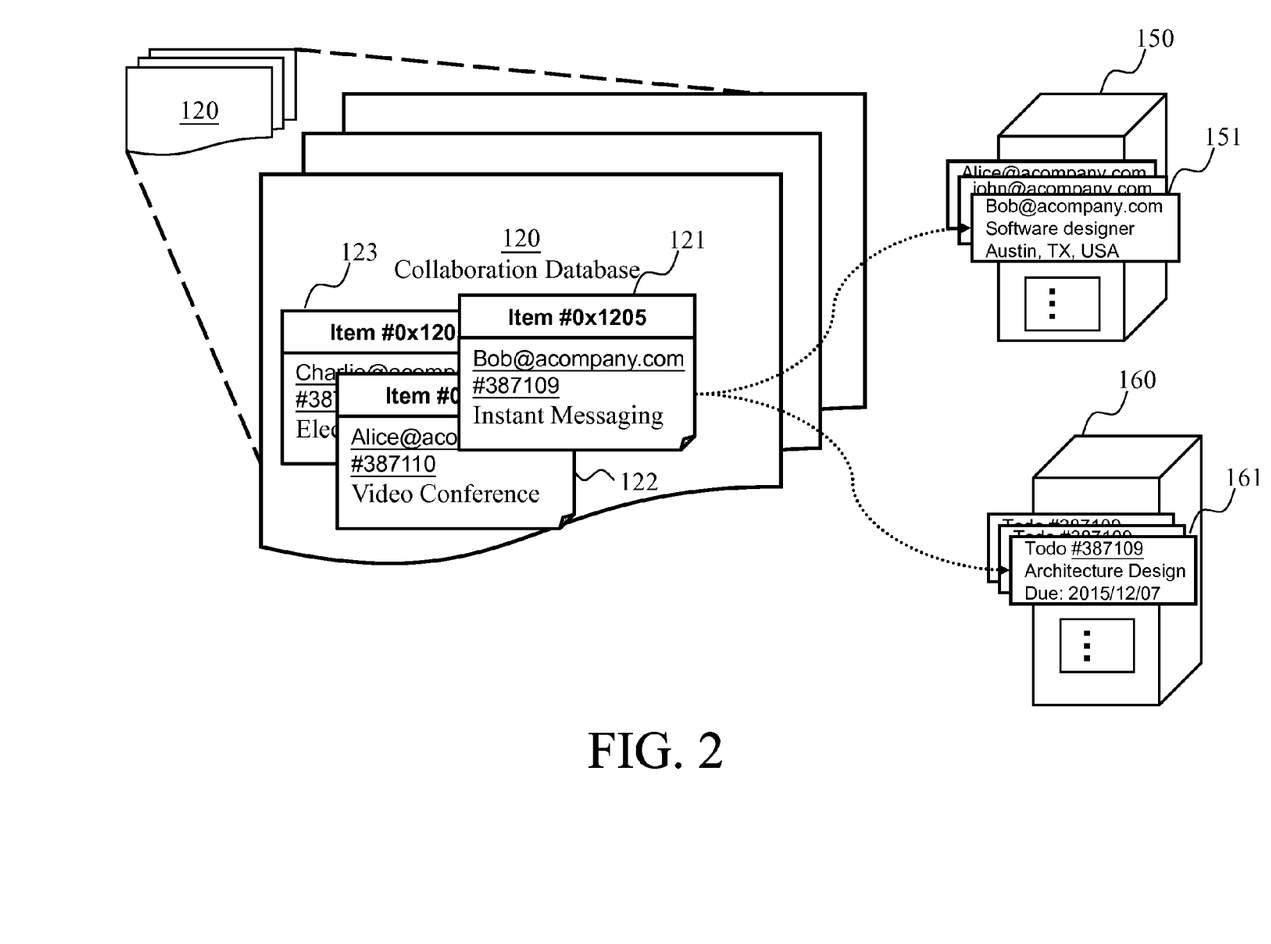
FIG. 2 is a schematic view of a collaboration database according to one embodiment of the present invention.

FIG. 2 further illustrates the collaboration database 120 according to one embodiment of the present invention. For example, when a user, namely John, discusses with another user, namely Mary, via the instant messaging service, and finds that there is a need to further discuss with Bob for some details. However, Bob is not on-line at that time. In such a situation, John does not have to start the task management tool 140 and may create a task immediately within the instant messaging module 130. For example, John may create a task with following information: a contact name "Bob," an electronic mail address "Bob@acompany.com," a contact category "instant messaging," a task summary "Architecture Design," a detail task description and a task schedule "Before 2015/12/7." Based on this information, the instant messaging module 130 may accordingly create a task item 161 and a collaboration item 121. The task item 161 may include a task summary, a task description and a task schedule, while the collaboration item 121 may include a task identifier associating with the task item 161, and a collaboration identifier associating with contact information 151. As shown in FIG. 2, the task item 161 is stored in the collaboration server 160 and the collaboration item 121 is stored in the client 120 in this embodiment. The collaboration item 121 contains the task identifier "387109" and the collaboration identifier "Bob@acompany.com" and "instant messaging." In this embodiment, the contact information 151 is stored in the collaboration server 150 in advance. However, the user may create new contact information 151 along with the new task item 161 in other embodiment.

Figure 3A:
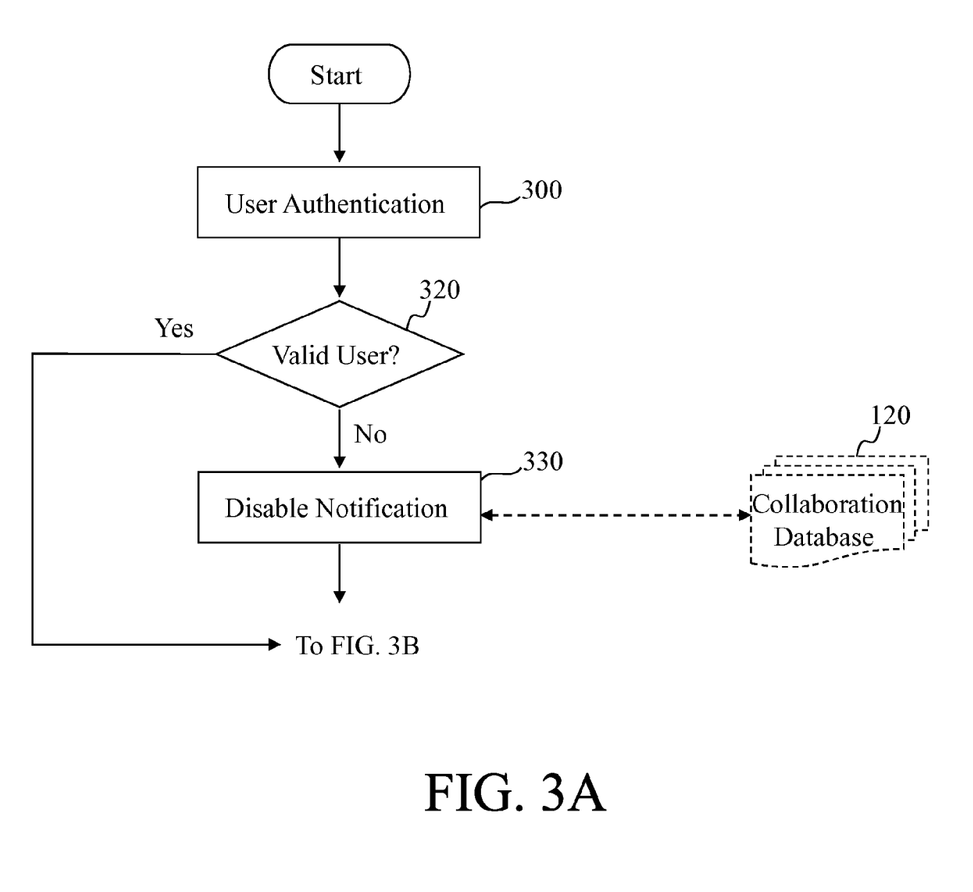
FIG. 3A and FIG. 3B are flowcharts illustrating a method according to one embodiment of the present invention.
Figure 3B:
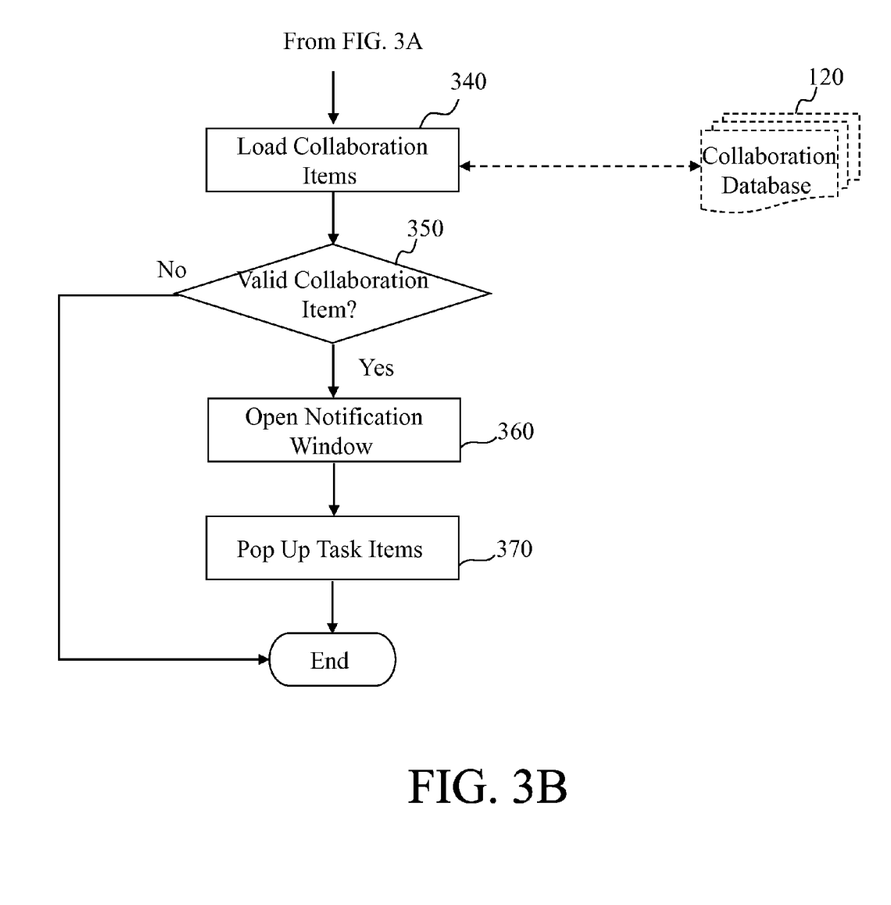

Referring to FIG. 3A and FIG. 3B, when John logs into the instant messaging server 150, the system may perform user authentication in step 300 and determine whether he/she is a valid user of a related system in step 320, where a related system refers to one linked to the IM messaging server yet not needed to perform IM specific functions. If he/she is not a valid user, the notice function (and other extended service capabilities, such as task management functionality) will be disabled in step 330. Otherwise, the system will load the collaboration items 121 related to tasks linked to the user from the collaboration database 120 in step 340. In step 350, it is determined whether the collaboration items and/or tasks are still valid. For example, when John logs into the instant messaging service, the system will determine that there is a valid collaboration item associating to an outstanding task item related to Bob. Therefore, the system will initiate a notification window 400 as further shown in FIG. 4A to FIG.

Figure 4A:
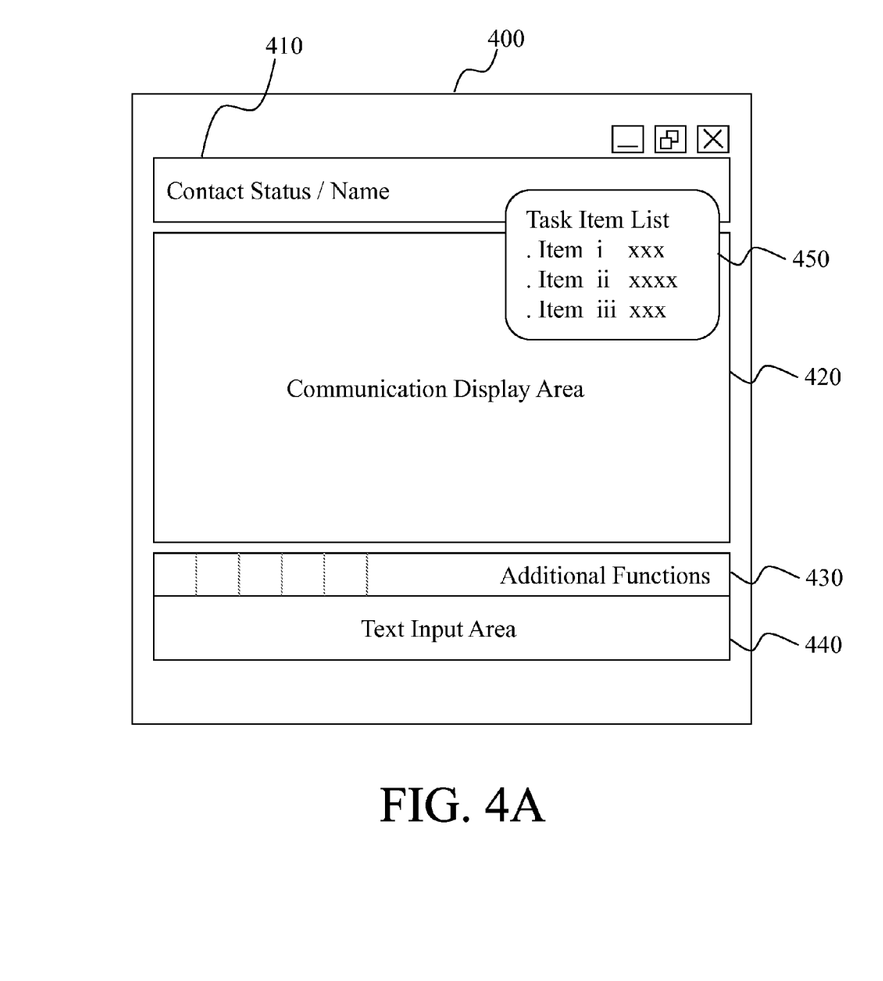
FIG. 4A to FIG. 4C are schematic views illustrating a user interface according to one embodiment of the present invention.
Figure 4B:
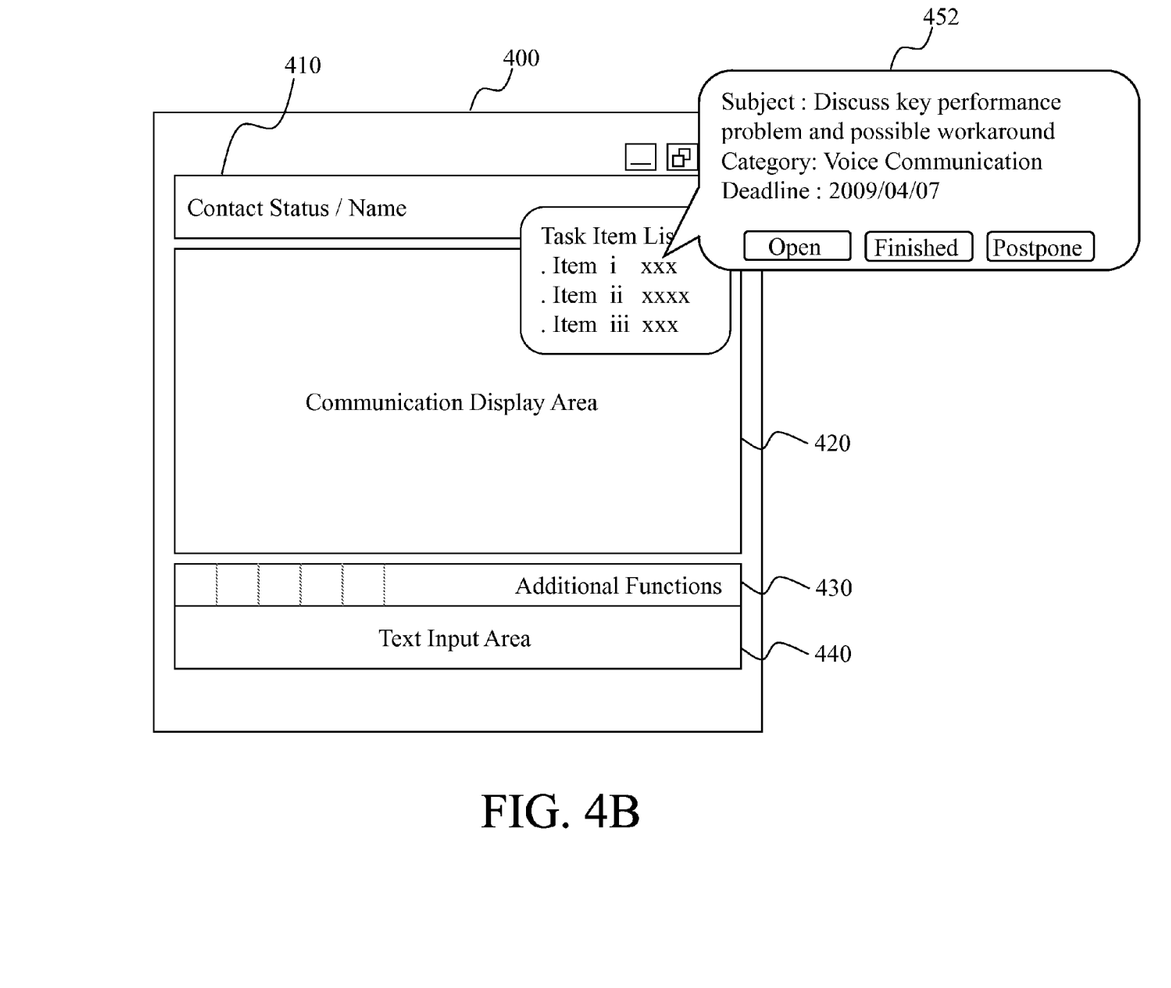
Figure 4C:
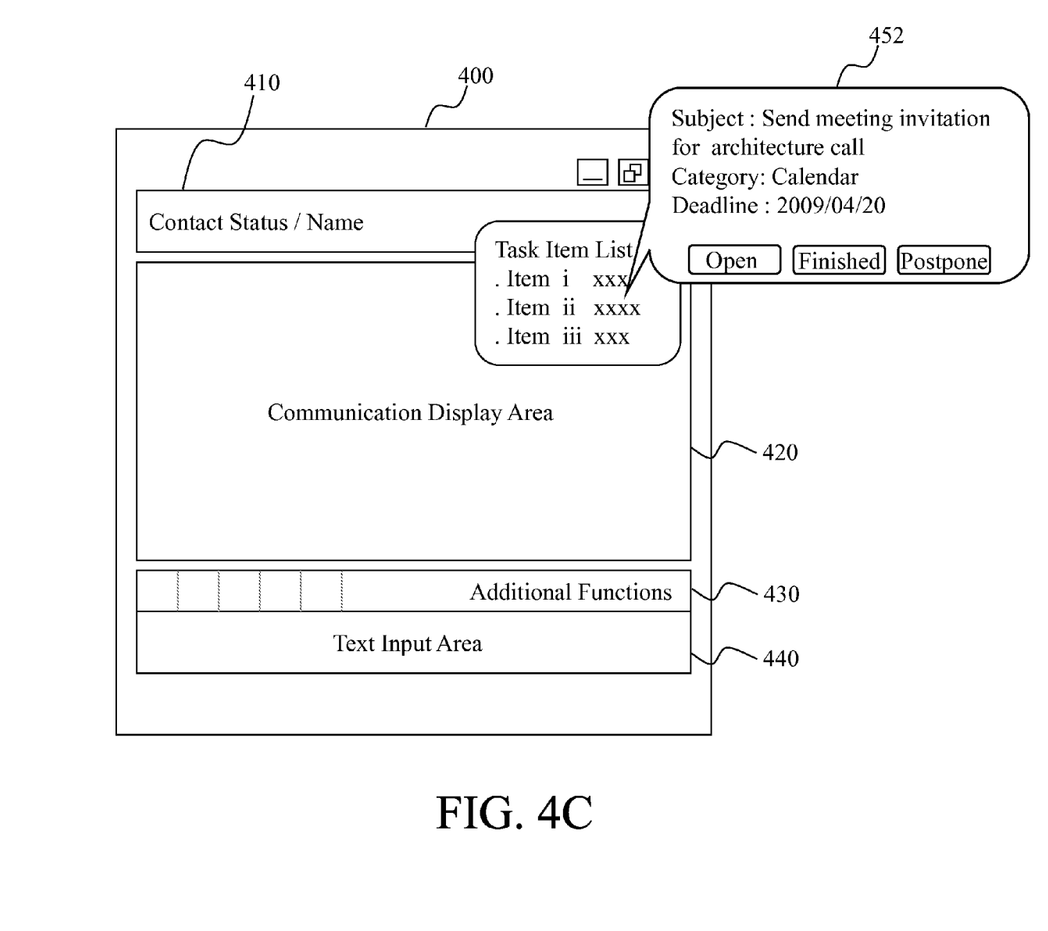

4C in step 360 and then display the task item list 450 in the notification window 400 in step 370. At this moment, John will see the task items 121 popped up by the system and may contact with Bob through the designated tools, such as instant messaging, voice communication, calendar notification and so on. In one exemplary embodiment, the system may automatically pop up an instant messaging window according to the contact category specified in the collaboration item 121 when Bob logs into the instant messaging service so that John may easily contact with Bob without any additional effort.

Similarly, the user may specify other contact categories upon creating the task item, such as the collaboration item 122 appointing the videoconference and the collaboration item 123 appointing the electronic mail as shown in FIG. 2. In addition, other communication methods may still be implemented according to an embodiment of the present invention, such as voice communication, calendar notification, blogging/micro-blogging and so on. In this connection, the instant messaging service as shown in FIG. 1 is depicted for an exemplary purpose rather than a limitation. In the present invention, all services for contacting with other people are collectively referred to as the "communication module." For example, the communication module shown in FIG. 1 is the instant messaging module 130.

Referring to FIG. 4A to FIG. 4C, a user interface 400 according to one embodiment of the present invention is shown for exemplary purpose. When a user logs into the instant messaging service, he/she will see the contact status/name 410, the communication display area 420, the additional function area 430, text input area 440 and task item list 450. The user may clearly and easily notice all outstanding task items via the task item list without additionally reference to the task management tool 140. If the user wants to know the details of any task item, he/she may move the cursor over the task item, such as via an operation on a mouse or a pointer, and a notification 452 will be automatically popped up as shown in FIG. 4B. Upon sending the notification 452, the user may simply click the "Open" button so that the communication module will accordingly send a communication request to the target. On the other hand, if the user finds any task item has already been finished, such as he/she already communicated with the target through other approach, he/she may simply click the "Finished" button and such task item will be accordingly removed from the task item list 450. Similarly, the user may also click the "Postpone" to set a new schedule for this task item. In addition, the user may move the curser to other task items to perform other outstanding tasks.

Figure 5:
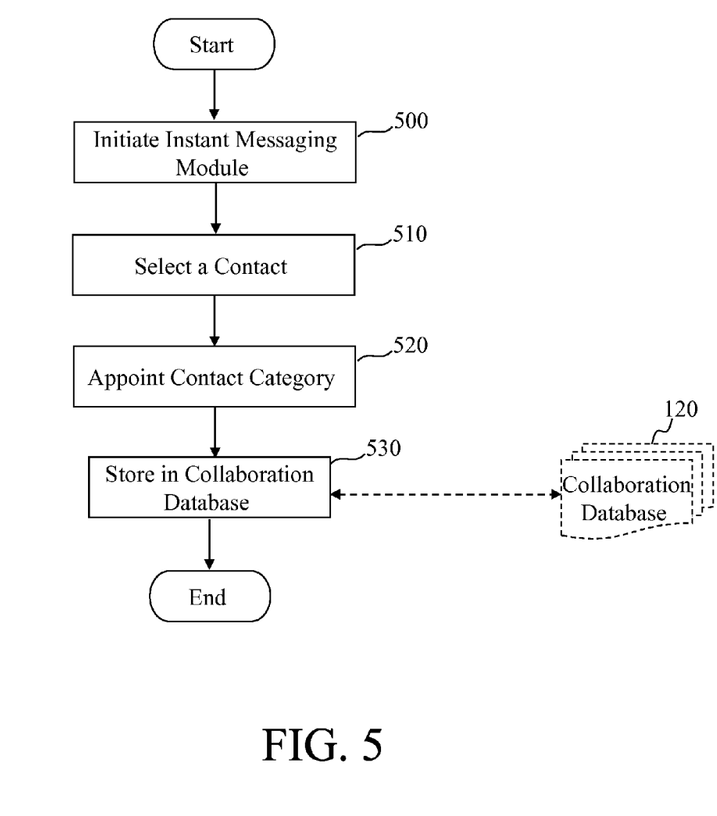
FIG. 5 is a flowchart illustrating a method for establishing a collaboration item according to one embodiment of the present invention.

FIG. 5 is a flowchart illustrating a method for establishing a collaboration item according to one embodiment of the present invention. In step 500, the user may initiate the instant messaging module 130. In step 510, the user may select a target person as a contact. The information of the contact may be provided by the system through a predefined database or manually created by the user in step 510. In step 520, a contact category is appointed, such as the instant messaging, the videoconference or any other communication approaches. In step 530, the collaboration item is created and stored in the collaboration database 120. In other embodiment, the user may create the collaboration item via the task management tool 140. Even when the collaboration item is created by the task management tool 140, rather than communication module—such as the instant messaging module 130, the user may still be notified in the instant messaging module 130 according to the embodiment of the present invention. Due to the collaboration database 120, the information on the instant messaging server 150 and the collaboration server 160 may be shared via the instant messaging module 130 and the task management tool 140. Therefore, the user may be properly notified by the system regardless the process of establishment of task item.

Figure 6:
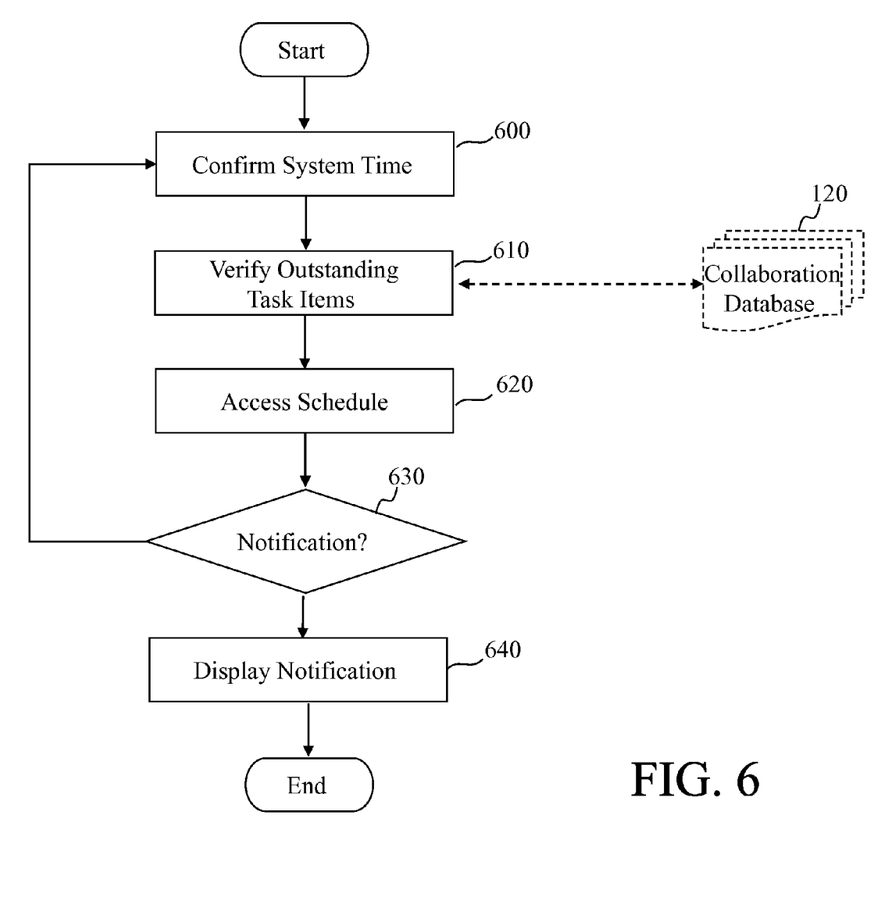
FIG. 6 is a flowchart illustrating a method for displaying a notification according to one embodiment of the present invention.

FIG. 6 is a flowchart illustrating a method for displaying a notification according to one embodiment of the present invention. In step 600, the system will confirm the current time and then verify whether there is any outstanding task item in step 610. After obtaining the information such as from the collaboration database 120, the schedule of the task item will be accessed and checked in step 620, which will be further discussed as below. For example, the user may set a deadline or a kick-off time as the schedule. In this embodiment as an example, John needs to discuss with Bob at the time during the 5th to 10th day of the next month for an event on the 15th day of that month. On such condition, John may create a task item with a kick-off time at the 5th day and a deadline at the 10th day. In step 630, it is determined whether a notification is required. For example, if the current time is prior to the kick-off time or the task is already finished, then there is no need for any notification. If the current time is just between the kick-off time and the deadline, a notification is displayed for the user such as the window shown in FIG. 4A to FIG. 4C. If the current time is beyond the deadline and the task item is still pending, then an additional warning may be displayed, such as a notification in red color. In addition, the notifications such as the task items shown in the task item list may be further filtered to screen out the most useful information. For example, the user may sort the task items by the kick-off time/deadline, or by other conditions, such as the priority of the task item, whether the target is currently online, whether the task item is delayed and etc. In this embodiment, the method as shown in FIG. 6 may be embodied as a daemon resided in the operating system. However, other type of applications may be used in other embodiments.

Figure 7A:
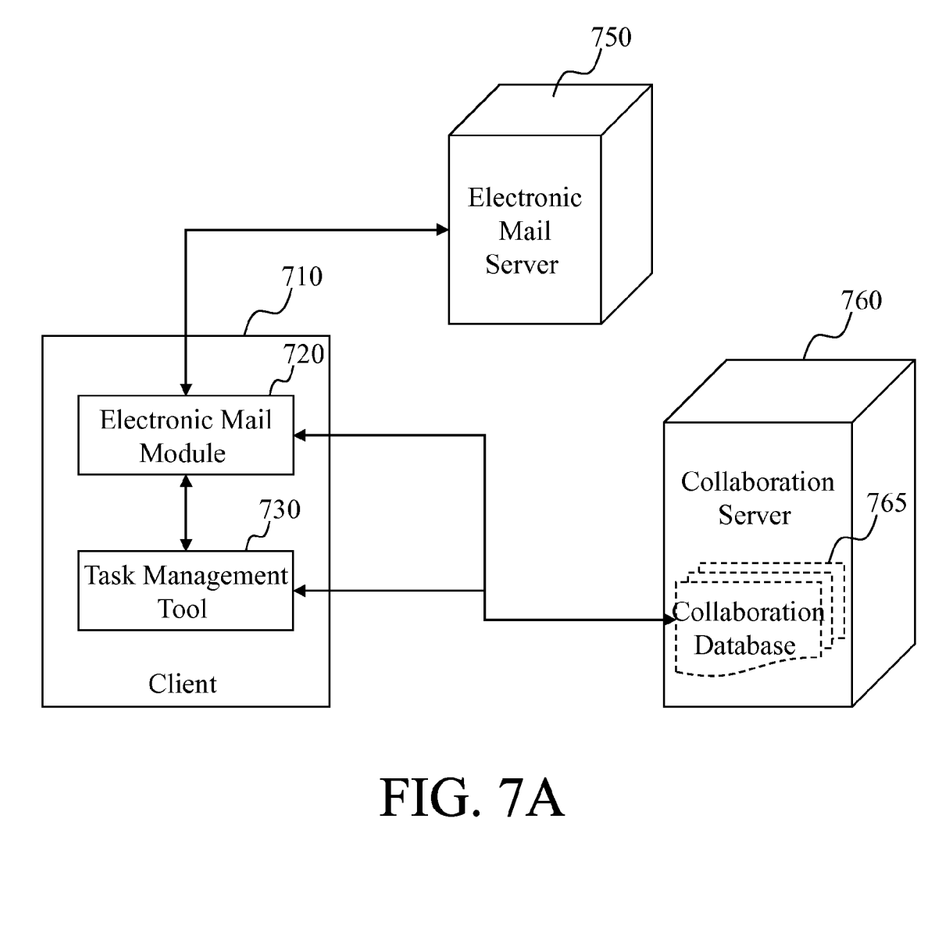
FIG. 7A to FIG. 7C are schematic views illustrating some exemplary embodiments according to the present invention.
Figure 7B:
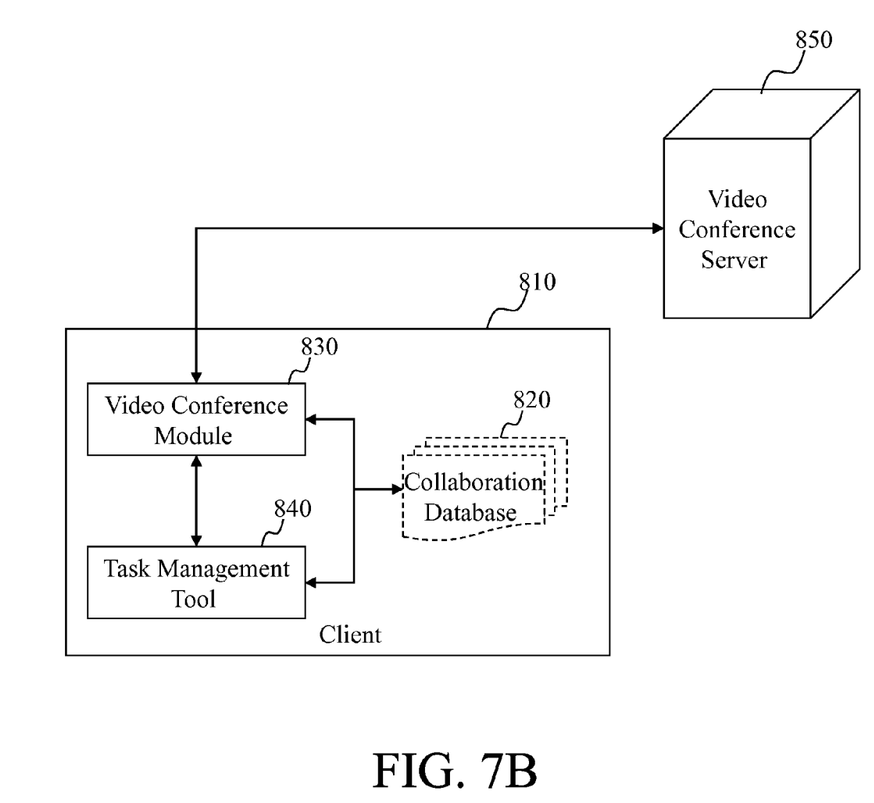
Figure 7C:
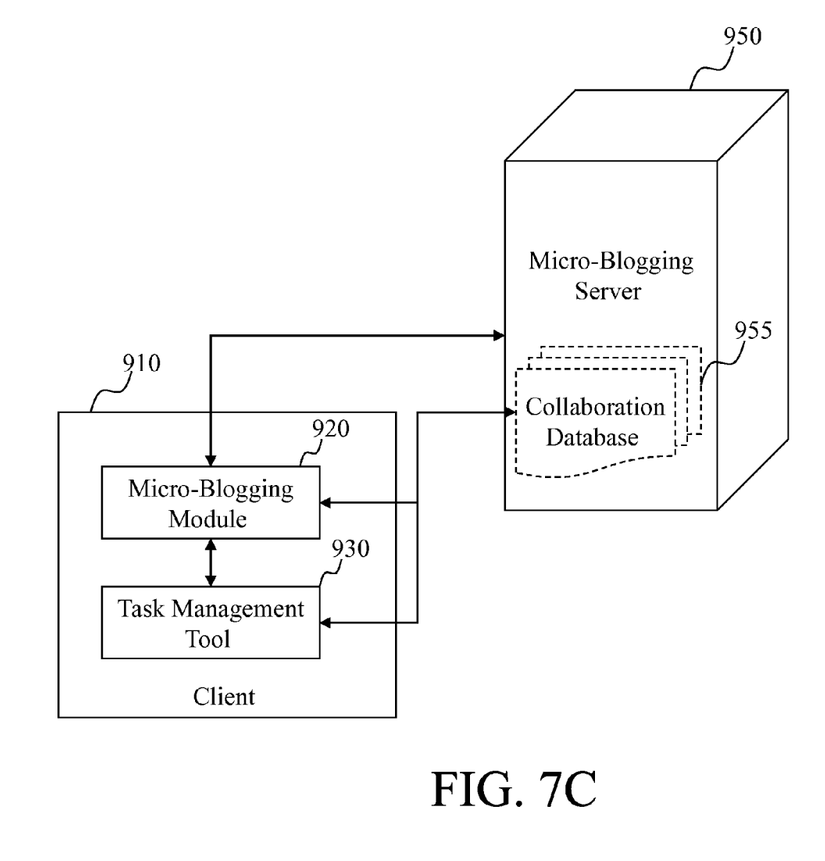

Please note that the above details are illustrated as exemplary embodiments rather than limitations. In fact, the present invention may still have various different modifications, which still fall within the scope of the present invention. For example, FIG. 7A to FIG. 7C illustrate some exemplary embodiments according to the present invention. In FIG. 7A, the collaboration database 765 is located in the collaboration server 760 and the communication module in the client 710 is embodied as an electronic mail module 720 for using the service provided by the electronic mail server 750. In FIG. 7B, the collaboration server is omitted while the collaboration database 820 is located in the client 810. The communication module in the client 810 is embodied as a videoconference module 830 for using the service provided by the videoconference server 850. In FIG. 7C, the collaboration server is omitted while the collaboration database 955 is located in the micro-blogging server 950. The communication module in the client 910 is embodied as a micro-blogging module 920, such as a browser, for using the service provided by the micro-blogging server 850. In this connection, those skilled in the arts may understand that the present invention may be implemented as various embodiments, such as the client may have more than one communication module. Or in another embodiment, the client may use a peer-to-peer communication module and contact with the target directly without involving any server.

Based on the above descriptions, the user may easily and quickly access important task item through the communication modules and/or task management tools by using the collaboration database therebetween. Therefore, the work efficiency may be significantly improved.

The description shown above is only about the preferred embodiments of the present invention and is not intended to limit the scope of the invention. Any equivalent variations or modifications without departing from the spirit disclosed by the present invention should be included in the appended claims.

What is claimed is:

1. A method for managing task associating with contact information, comprising:
   storing a task item in a collaboration database, wherein the collaboration database able to be accessed by a communication module and a task management tool, which both run on a client, wherein the communication modules is able to access a communication server that provides a communication service to the client, wherein the task management tool is able to access a collaboration server that provides a collaboration service to the client, wherein the communication module and the task management tool share information through the collaboration database in order to provide an integrated service to the user, wherein the collaboration database is a non-transient storage medium local to the client, which is remotely located from the communication server and from the collaboration server;
   establishing, within the collaboration database, a collaboration item containing a task identifier associating with the task item, and a collaboration identifier associating with contact information;
   calling the communication module running in a client according to the contact information of the collaboration database; and
   displaying the task item within a user interface of a communication application via the communication module.

2. The method of claim 1, wherein the communication module is an instant messaging module, wherein the communication server is an instant messaging server that provides instant messaging services to the client.

3. The method of claim 2, wherein the instant messaging module and the task management tool share information through the collaboration database in order to provide an integrated service to the user.

4. The method of claim 3, wherein the instant messaging server and the collaboration server are two different servers provided by different entities, wherein the instant messaging module is a module of an instant messaging application running on the client, and wherein the task management tool is a tool of a task management application running on the client, wherein the instant messaging application and the task management application are two distinct applications, configured to run autonomously independent of each other.

5. The method of claim 2, wherein the instant messaging module permits a user to create the task from within a user interface of the instant messaging application without running the task management tool.

6. The method of claim 2, wherein said method further comprises:
   when the a user logs onto the instant messaging server from the client and when the user is a valid user of the collaboration database, automatically logging into the collaboration database;
   determining a set of collaboration items from the collaboration database that are valid for the user;
   initiate a notification window; and
   displaying a task item list in the notification window wherein the task item list comprises the determined set of collaboration items.

7. The method according to claim 1, wherein the step of storing the task item comprises: establishing the task item via the communication module, the task item including at least one of the following: a task summary, a task description and a task schedule; and storing the task item in a collaboration database, wherein in absence of the communication module, the communication application is unable to access the collaboration database, and wherein the communication module is a module not originally packaged and sold with the communication application.

8. The method according to claim 1, wherein the step of storing the task item comprises: establishing the task item via a task management module, the task item including at least one of the following: a task summary, a task description and a task schedule; and storing the task item in a collaboration database.

9. The method according to claim 1, wherein the establishing of the collaboration item comprises: establishing the contact information based on at least one of the following: a name, an electronic mail address, a category and an address.

10. The method according to claim 1, wherein the step of displaying the task item via the communication module comprises: initiating the communication module; arranging at least one available task item in a list; and selectively displaying content of the task item responsive to an operation by a user.

11. The method according to claim 1, further comprising: sending via the communication module a request for communication to at least one contact person based on the contact information.

12. The method of claim 1, further comprising: using the communication module to arrange a list indicating at least one available task item and to selectively display content of the task item responsive to an operation of a user.

13. A system for managing task associating with contact information, comprising:
   a communication tool able to access a communication server that provides a communication service to at least one client; a task management tool that is able to access a collaboration server that provides a collaboration service to the at least one client;
   a collaboration database storing at least one collaboration item, the collaboration item having a task identifier associating with the task item, and a collaboration identifier associating with contact information, wherein the collaboration database is able to be accessed by the communication tool and the task management tool, which both run on the client, wherein the communication tool arranges a list indicating at least one available task item and selectively displaying content of the task item responsive to an operation of a user, wherein the communication module and the task management tool share information through the collaboration database in order to provide an integrated service to the user, wherein the collaboration database is a non-transient storage medium local to the client, which is remotely located from the communication server and from the collaboration server.

14. The system of claim 13, wherein the communication tool is an instant messaging module, wherein the communication server is an instant messaging server that provides instant messaging services to the client.

15. The system of claim 14, wherein the instant messaging module and the task management tool share information through the collaboration database in order to provide an integrated service to the user.

16. The system of claim 15, wherein the instant messaging server and the collaboration server are two different servers provided by different entities, wherein the instant messaging module is a module of an instant messaging application running on the client, and wherein the task management tool is a tool of a task management application running on the client, wherein the instant messaging application and the task management application are two distinct applications, configured to run autonomously independent of each other.

17. A computer program product comprising a non-transitory computer readable storage medium having computer usable program code embodied therewith, the computer usable program code comprising:

computer usable program code stored in the non-transitory computer readable storage medium that when executed by a processor is operable to store a task item in a collaboration database, wherein the collaboration database able to be accessed by a communication module and a task management tool, which both run on a client, wherein the communication modules is able to access a communication server that provides a communication service to the client, wherein the task management tool is able to access a collaboration server that provides a collaboration service to the client;

computer usable program code stored in the non-transitory computer readable storage medium that when executed by a processor is operable to establish, within the collaboration database, a collaboration item containing a task identifier associating with the task item, and a collaboration identifier associating with contact information;

computer usable program code stored in the non-transitory computer readable storage medium that when executed by a processor is operable to call the communication module running in a client according to the contact information of the collaboration database; and computer usable program code stored in the non-transitory computer readable storage medium that when executed by a processor is operable to display the task item within a user interface of a communication application via the communication module, wherein the computer usable code to store the task item establishes the task item via the communication module, the task item including at least one of the following: a task summary, a task description and a task schedule; and wherein the computer usable code stores the task item in a collaboration database, wherein in absence of the communication module, the communication application is unable to access the collaboration database, and wherein the communication module is a module not originally packaged and sold with the communication application.

18. The computer program product of claim 17, wherein the communication module is an instant messaging module, wherein the communication server is an instant messaging server that provides instant messaging services to the client.

* * * * *